(12) United States Patent
Malige et al.

(10) Patent No.: US 8,578,096 B2
(45) Date of Patent: Nov. 5, 2013

(54) POLICY FOR STORING DATA OBJECTS IN A MULTI-TIER STORAGE SYSTEM

(75) Inventors: Raghupathi Malige, San Jose, CA (US); Meher Shah, Newark, CA (US); Gautham Ravi, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 212 days.

(21) Appl. No.: 13/082,986

(22) Filed: Apr. 8, 2011

(65) Prior Publication Data

US 2012/0260040 A1 Oct. 11, 2012

(51) Int. Cl.
*G06F 12/08* (2006.01)
(52) U.S. Cl.
USPC ................................. 711/117; 711/E12.016
(58) Field of Classification Search
USPC .......................................... 711/117, E12.016
See application file for complete search history.

(56) References Cited

U.S. PATENT DOCUMENTS

| | | | |
|---|---|---|---|
| 6,594,674 B1 * | 7/2003 | Kaplan et al. | 1/1 |
| 6,880,102 B1 * | 4/2005 | Bridge | 714/6.12 |
| 7,509,468 B1 * | 3/2009 | Dalal et al. | 711/163 |
| 2003/0140210 A1 * | 7/2003 | Testardi | 711/203 |
| 2009/0019459 A1 * | 1/2009 | Rowan et al. | 719/328 |
| 2010/0070466 A1 * | 3/2010 | Prahlad et al. | 707/609 |

* cited by examiner

*Primary Examiner* — Yong Choe
(74) *Attorney, Agent, or Firm* — Wilmer Cutler Pickering Hale and Dorr LLP

(57) ABSTRACT

A sliding window policy is implemented to manage database objects. At a first time, a first portion of a database object is allocated to a first tier of a multi-tier storage system. The first portion corresponds to a first specified percentage of the size of the database object at the first time and is selected according to information associated with the database object. The remaining portion of the database object at the first time is allocated to one or more other tiers. At a second (later) time, a second portion of the database object is allocated to the first tier. The second portion corresponds to a second specified percentage of the size of the database object at the second time and is also selected according to information associated with the database object. The remaining portion of the database object at the second time is allocated to the other tier(s).

20 Claims, 9 Drawing Sheets

| TABLE 470 | | COLUMN(S) | |
|---|---|---|---|
| ROW | ENTRY 0 | ENTRY 1 | ENTRY M |
| 0 | <VALUE> | <VALUE> | <VALUE> |
| 1 | <VALUE> | <VALUE> | <VALUE> |
| 2 | <VALUE> | <VALUE> | <VALUE> |
| N | <VALUE> | <VALUE> | <VALUE> |

POLICY FOR STORING DATA OBJECTS IN A MULTI-TIER STORAGE SYSTEM

BACKGROUND

Many commercial databases and applications store their data in files. A database may be divided into one or more logical storage units called table spaces, and a table space may contain logical entities, such as tables and indexes. A table space may be stored in one or more physical data files. Thus, a database stores data logically in table spaces and physically in data files associated with a corresponding table space. A data file is associated with only one table space and only one database.

Table spaces may further be divided into logical units referred to as segments, which may be divided into extents. An extent is a collection of contiguous data blocks in a data file; a data block corresponds to a specific number of bytes of physical database space on disk. For tables, storage space may be allocated on demand as new rows are inserted into a table. Tables may be spread across one or more data files. Thus, a data file may include extents of multiple tables, and a table may include extents from multiple data files.

The data files are typically large in size, and portions of the files are randomly accessed. Accordingly, data stored in some portions of a data file may be subsequently accessed either infrequently or not at all, remaining relatively untouched or cold for extended periods of time or over the remaining life of the data file.

Conventional storage management and file relocation solutions use multi-tier storage systems to balance performance and costs. At higher tiers, performance is better but the cost is higher, while at lower tiers the cost is reduced but so is performance.

The amount of data being stored continues to increase at a high rate. Also, government and industry regulations may require that data be retained for longer periods of time. However, as noted above, only a fraction of the data may be accessed frequently. It is not cost-effective to store all data in high-end storage (e.g., higher tiers). Accordingly, a policy that helps allocate data amongst the different tiers and helps move data out of the highest tier would be valuable.

SUMMARY

According to embodiments of the present disclosure, a database object (or data object) is accessed at various points in time and portions of the data object are allocated to different tiers in a multi-tier storage system. The data object may be a table; data associated with the table may be stored as extents.

More specifically, at a first time, a first portion of the data object (e.g., a first number of extents) is allocated to a first tier of the multi-tier storage system. The first portion (e.g., the first number of extents) corresponds to a first specified percentage of the size of the data object at the first time. The first portion (first number) is selected according to information associated with the data object. In one embodiment, the information used to select the first portion is time-based. The time-based information can be used to rank data in the data object from newest data to oldest data. Accordingly, the first portion can be selected by selecting relatively newer data until the first specified percentage is reached. The remaining portion of the data object at the first time is allocated to one or more other tiers of the multi-tier storage system.

At a second (later) time, a second portion of the data object (e.g., a second number of extents) is allocated to the first tier. The second portion (e.g., the second number of extents) corresponds to a second specified percentage of the size of the data object at the second time. The second portion (second number) is also selected according to the aforementioned information (e.g., time-based information) associated with the data object. Accordingly, the second portion can be selected by selecting relatively newer data until the first specified percentage is reached. The remaining portion of the data object at the second time is allocated to the other tier(s).

A different percentage can be specified per data object. The specified percentage can remain constant or can change over time.

In one embodiment, the total size of a table is determined. The size of each extent in the table is determined. The most recent extents are identified, and an extent list is prepared according to an allocation (relocation) policy. For example, the policy might specify that 25 percent of the most recently accessed data in a table is to be stored in a higher tier (e.g., tier 1) while the remainder of the data in the table is to be stored in the next highest tier (tier 2). In this example, 25 percent of the most recently accessed extents would be included in the extent list. From the extent list, catalog tables can be queried to translate the extents to a file name, offset, and length. Generally speaking, the extents are entries in a table in a database format, and are translated into memory locations. Relocation methods associated with the multi-tier storage system are used to allocate and move extents in the extent list to the specified tier. Periodically, the table is monitored and the policy enforced. For example, the extent list can be updated on a daily basis, in which case the data can be allocated/reallocated among the tiers on a daily basis.

In effect, a sliding window policy is implemented to manage data objects (e.g., database tables). The sliding window encompasses the most recent data, and the size of the window can change over time as the amount of data in the table increases or decreases (the specified percentage may remain constant, but the amount of data might increase or decrease). Correspondingly, data in tier 1 can be moved to tier 2 as new data is added to the table.

Thus, according to embodiments of the present disclosure, the most recently accessed data (which, in many cases, is also the data most often used) can be stored in a higher tier. With the sliding window concept, older data will be moved back to a lower tier, allowing room for newer data in the higher tier, thus controlling the growth of the higher tier. Storage needs can be strategically and effectively planned, and storage can be grown proportionally to the amount of data without compromising performance. The issue of failed database transactions, which might arise if the storage system runs out of usable space on a particular tier, can be avoided. Also, embodiments according to the present disclosure permit a granular implementation (e.g., at the extent level) that provides value in terms of storage utilization even for structured data like databases.

The allocation (relocation) policy can be changed over time as the usefulness and criticality of the stored data changes, so that the right amount of data is stored in the right storage tier. In general, costs are reduced and performance is improved.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

DETAILED DESCRIPTION

Figure 1:
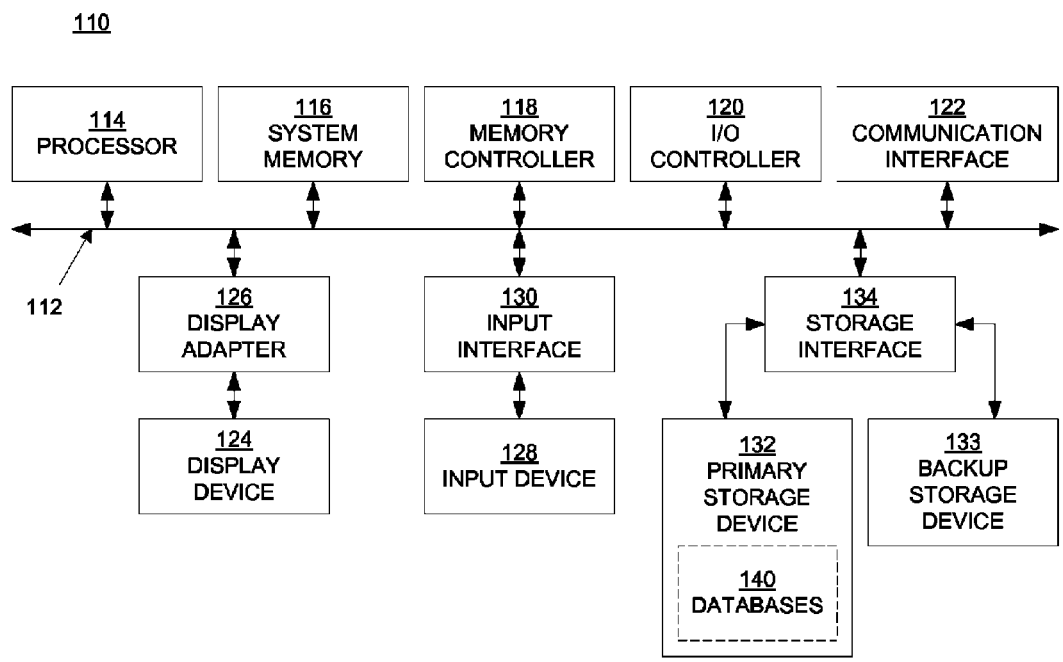
FIG. 1 is a block diagram of an example of a computing system capable of implementing embodiments of the present disclosure.

As data is inserted into data objects such as tables, new extents (contiguous blocks in a data file) are allocated as needed from data files in a table space. Generally speaking, recently added table data is of more interest than older data. According to embodiments of the present disclosure, the most recently added extents are identified and stored in the highest tier in a multi-tier storage system, while older extents are identified and moved to a lower tier or tiers. This can be accomplished through the use of a sliding window allocation (relocation) policy. Accordingly, performance criteria can be met without increasing storage costs.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "accessing," "allocating," "selecting," "storing," "determining," "using," "ordering," "ranking," "moving," "copying," "deleting," "relocating," "identifying," "translating," or the like, refer to actions and processes (e.g., flowcharts 700 and 800 of FIGS. 7 and 8, respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
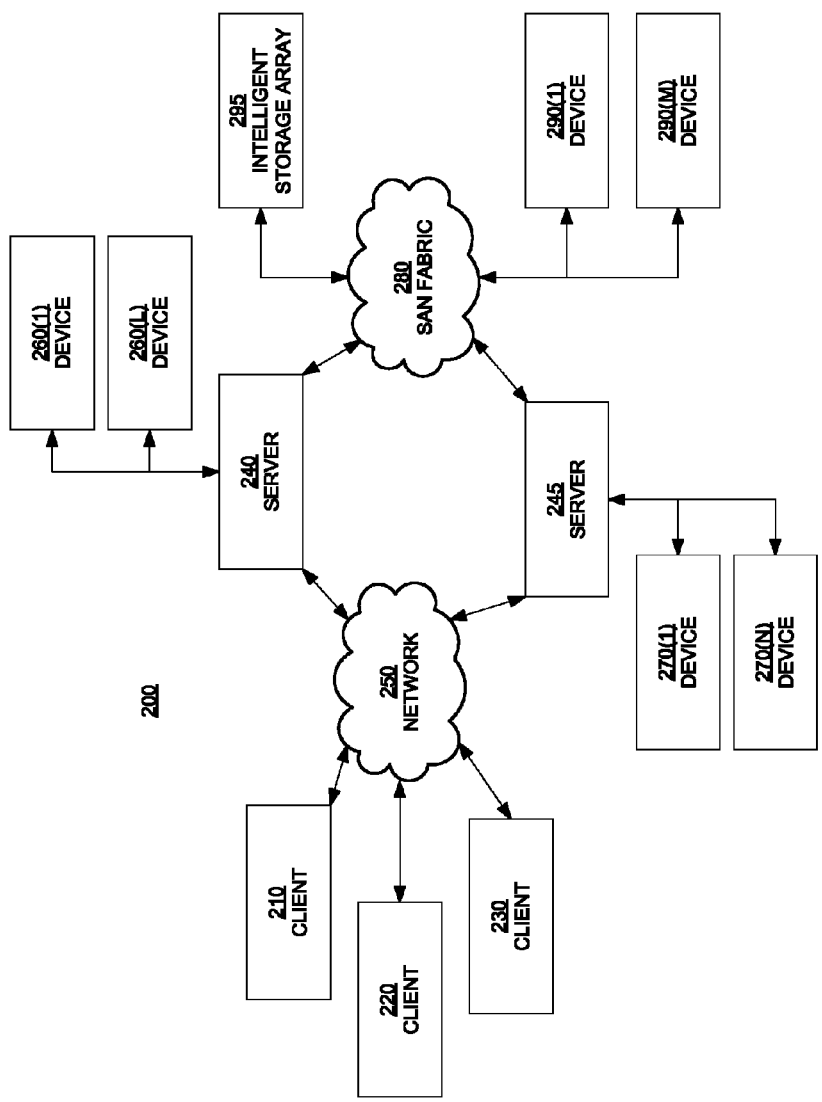
FIG. 2 is a block diagram of an example of a network architecture capable of implementing embodiments of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Figure 3A:
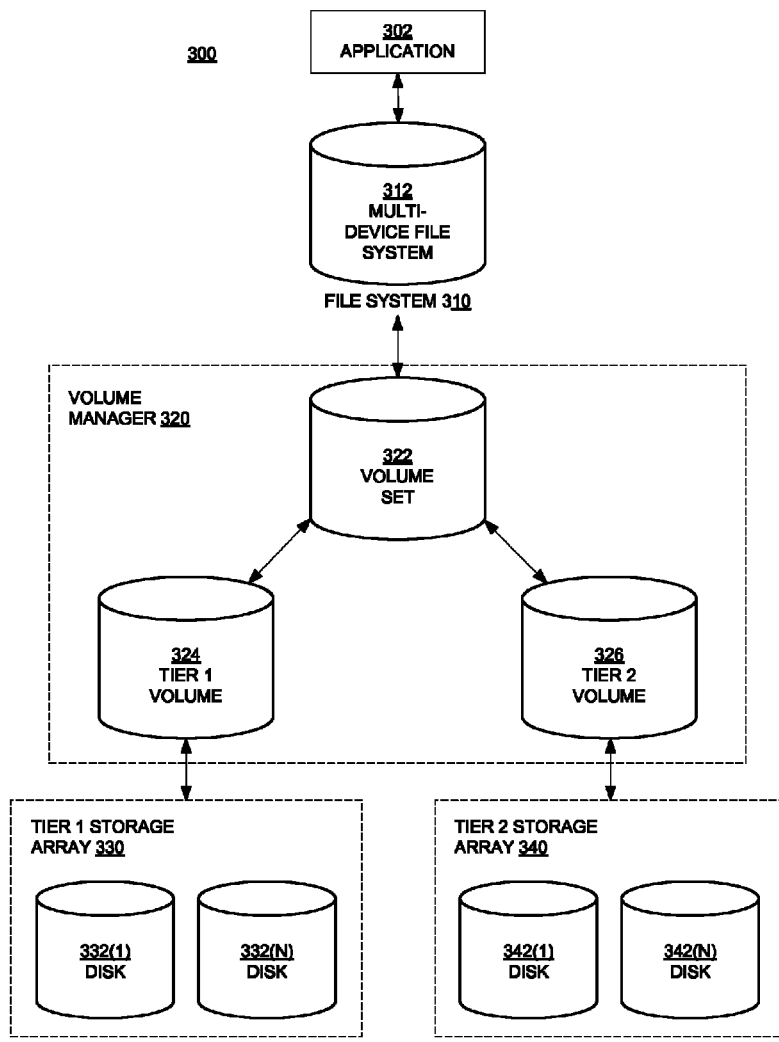
FIGS. 3A and 3B are block diagrams of examples of a multi-tier storage system capable of implementing embodiments of the present disclosure.

FIG. 3A is a block diagram of an example of a multi-tier storage system 300 upon which embodiments of the present disclosure may be implemented. System 300 may include an application 302 in communication with a file system 310. File system 310 may include a multi-device file system 312 for multi-tier storage. Multi-tier storage generally refers to the use of virtual or physical storage devices with different characteristics to provide differentiated storage for computing systems. Each tier may be ranked based on those characteristics. For example, storage devices in a multi-device file system may have different I/O performance, availability, and/or cost characteristics and may be ranked accordingly. In other words, higher ranked tiers may result in higher performance at a higher cost/price, and lower ranked tiers may result in lower performance at a reduced cost/price.

Storage system 300 can support multi-volume file systems through multi-device file system 312 and can provide automatic policy-based placement of portions (e.g., extents or blocks) of files within file system 310. A multi-volume file system may include file systems that occupy two or more virtual storage volumes. A multi-volume file system may present a single name space, making the existence of multiple volumes transparent to users and applications while maintaining awareness of each volume's identity, making it possible to control the locations at which portions of files are stored. In one embodiment, all files in multi-volume file system may be part of the same name space and are accessed and manipulated as though they occupy a single volume.

System 300 may also include a volume manager 320. Volume manager 320 may implement software-based virtualization for facilitating multi-tier storage in the form of virtual volumes configured from multiple hardware devices. Volume manager 320 may include a volume set 322. As used herein, the phrase "volume set" generally refers to the volumes on which a file system is constructed. Volume set 322 may be divided into a tier 1 volume 324 and a tier 2 volume 326. For example, tier 1 volume 324 may include tier 1 storage array 330 (e.g., disk 332(1) through disk 332(N)). Similarly, tier 2 volume 326 may include a tier 2 storage array 340 (e.g., disk 342(1) through disk 342 (N)).

Volume set 322 may be configured in a variety of manners. For example, tier 1 volume 324 and/or tier 2 volume 326 may be configured from enterprise disk array logical unit number units (LUNs), mid-range disk array LUNs, and/or disks connected directly to their host systems. Tier 1 volume 324 and/or tier 2 volume 326 may also represent more complex configurations, such as mirrored volumes configured from RAID (Redundant Array of Independent Disks)—5 LUNs presented by two disk arrays.

Volume set 322 may represent a single dimensional storage hierarchy (e.g., a storage hierarchy where better quality storage costs more). In other embodiments, volume set 322 may represent a multi-dimensional storage hierarchy. In such embodiments, storage performance may be influenced by hardware cost and configuration. Storage tiers created from physically similar components may also have significantly different costs based on the functionality they provide. For example, a tier of storage may be configured to take periodic full-sized snapshots or to replicate itself remotely, while another tier utilizing the same basic hardware components may not. As another example, while more expensive devices may outperform less expensive devices, virtual volumes with more columns (e.g., separate disks or LUNs) tend to outperform volumes with fewer columns, and thus the cost per usable byte of the two may be equal.

As a third example, mirrored, RAID-5, and striped LUNs or volumes of equivalent capacity may form an available hierarchy, with higher availability costing more. Additionally or alternatively, mirrored, RAID-5, and striped volumes may have different widths, or numbers of columns, resulting in different performance characteristics and differences in failure protection.

Multi-tier storage systems, such as system 300, may provide improved placement of portions (e.g., extents or blocks) of files based on one or more of a variety of criteria. For example, system 300 may improve placement of portions of files based on actual access patterns, expected access patterns, and access times, to improve load balancing and/or availability, to provide flexibility for data protection, and/or for a variety of other reasons.

As just noted, file portion relocation may be based on access patterns of file portions. In such embodiments, I/O activity for one or more portions of files may be monitored, and relocation may be based on the intensity with which a portion of a file is accessed. Additionally or alternatively, multi-tier storage systems may be implemented to increase efficiency based on expected access patterns. For example, different portions of files may have different I/O performance needs. High data transfer performance may be important for some portions of a file, but less important for other portions of the file.

A multi-tier storage system may also improve load balancing among portions of a file. For example, a file may include numerous extents of a database that are accessed frequently. If such a file is located on a single storage device, the storage device may be overburdened with I/O requests. Multi-tier storage may be implemented to improve I/O response time of such a file by dividing the file among multiple storage devices.

Multi-tier storage systems may further be used to improve data availability. For example, some portions of a file may be critical and may need to be available continually, while other portions of the file may not be affected by downtime. As an example, a portion of a data file may contain point-of-sale or customer relationship management data, which may be critical for day-to-day operations, while another portion of the database file may include human resources data that may not be as critical. Multi-tier data systems presented herein may store such database data on different devices, with the point-of-sale and customer relationship management data being stored on higher availability devices than the human resources data.

Multi-tier storage systems disclosed herein may also provide more flexibility for data protection of portions of a file. Different data sets within a single file may have different commercial value. For example, a single file may include daily business transactions as well as quarterly and annual closing figures. Losing a day's business transactions may be significant to an enterprise but survivable. Losing quarterly or annual closing figures, on the other hand, might be catastrophic. Embodiments of the instant disclosure may store portions of the file that contain quarterly and annual closing figures on highly protected storage devices while storing portions of the file that contain daily business transactions on less protected (e.g., less frequently backed up) storage devices.

Multi-tier storage systems of the instant disclosure may also be implemented for various other general business purposes. For example, enterprise accounting, security, and regulatory compliance policies may require that certain storage devices be restricted to containing specific types of data from a database. Thus, a data file may be divided up for accounting, security, regulatory, and/or any other business purpose.

Figure 3B:
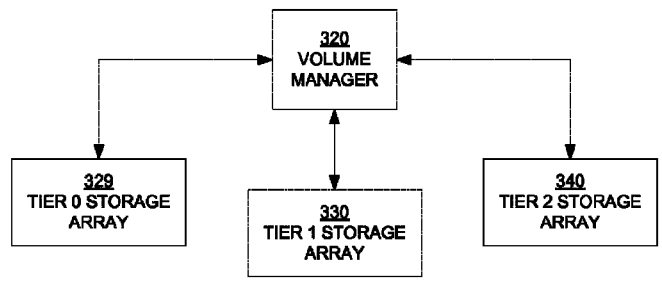

FIG. 3B is a block diagram showing a portion of a multi-tier storage system that includes three tiers: tier 0 storage array 329, tier 1 storage array 330, and tier 2 storage array 340. In the example of FIG. 3B, tier 1 may be the default or standard tier, tier 2 may be a lower-priced/lower performance tier relative to tier 1, and tier 0 may be a higher-priced/higher performance tier relative to tier 1. Tier 0 may be ranked higher than tier 1, which in turn is ranked higher than tier 2. The multi-tier storage system may have any number of tiers, depending on the pricing/performance structure in place and/or the different types of storage devices that may be available in the storage system. Such a multi-tier storage system may not only provide the opportunity for cost savings, but the opportunity to provide premium (e.g., tier 0) services to those willing to pay more.

Figure 4A:
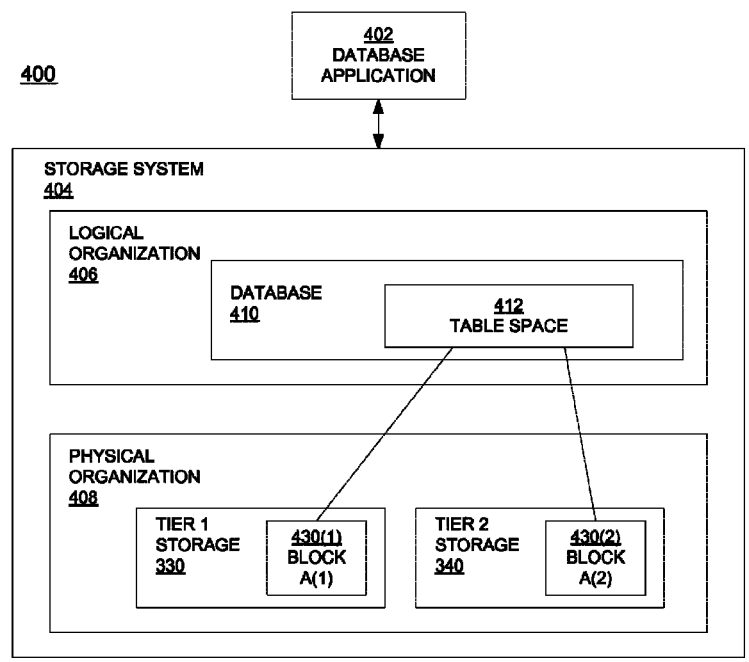
FIGS. 4A, 4B, 4C, and 4D are block diagrams illustrating elements of a database and their relationships according to an embodiment of the present disclosure.

FIG. 4A shows an example of a system 400 illustrating a logical organization 406 and a physical organization 408 of a database 410. System 400 may include a database application 402 and a storage system 404. Database application 402 may be any database application, including ORACLE, SQL (Structured Query Language) Server, MICROSOFT ACCESS, or any other application for managing databases.

Storage system 404 may include database 410 with a table space 412. Table space 412 may be any storage location where data objects for a database are stored. A table space may be used to allocate storage for segments, which may be database objects such as table data and/or indexes (refer also to FIG. 4B). Table space 412 may be stored in one or more physical data files (refer also to FIG. 4C).

Figure 4B:
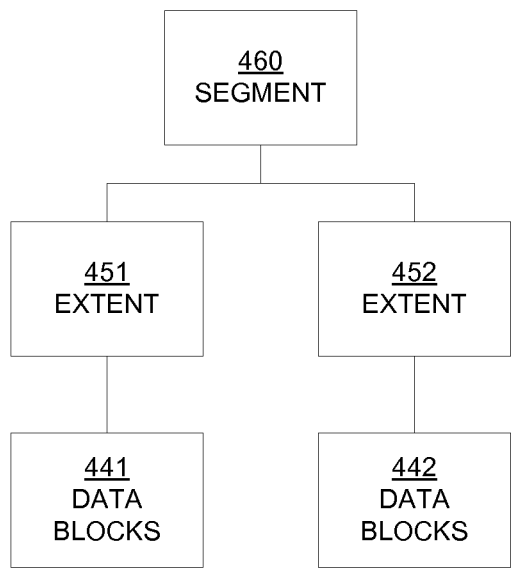

In the example of FIG. 4B, data is stored in contiguous data blocks 441 and contiguous data blocks 442. Each data block corresponds to a certain number of bytes of physical storage space (refer also to FIG. 4D). An extent is a specific number of contiguous data blocks. In the example of FIG. 4B, extent 451 includes data blocks 441, and extent 452 includes data blocks 442. A segment 460 includes a set of extents that are stored in one table space, such as table space 412 of FIG. 4A.

Figure 4C:
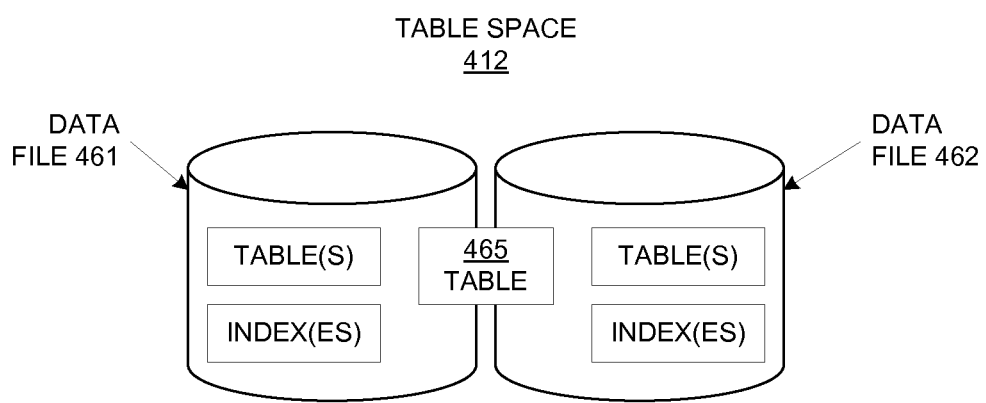

As noted previously herein, database objects may include tables and indexes that may be stored logically in table spaces and physically in data files. In the example of FIG. 4C, table space 412 includes data files 461 and 462. As shown in FIG. 4C, a data object (e.g., table 465) can span more than one data file.

Figures 4D, 5A:
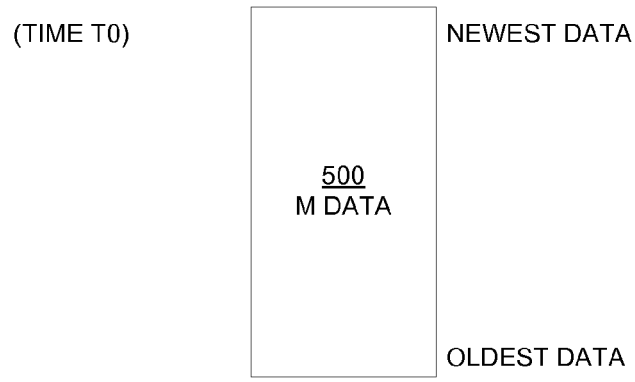
FIGS. 5A, 5B, 5C, and 5D illustrate an example of a sliding window allocation policy according to an embodiment of the present disclosure.

FIG. 4D illustrates an example of a table 470. Table 470 may include N rows; each row may include M entries or columns. In one embodiment, each row is identified by a signature or row identifier (ID). In one such embodiment, each row ID includes an object number, a file number, a block number, and a row number.

In one embodiment, the entries include a time-based entry. The time-based entry may be a time stamp. The time stamp can have any level of granularity; for example, the time stamp may include only a date, or it may include a date and a time of day (hour, or hour/minute, or hour/minute/second). The time stamp for a row may indicate the time that the row was added to the database, or the time stamp may indicate the time that the row was last accessed.

Absent a time stamp, the entries may include an entry that can be used to derive the equivalent of a time stamp. For example, the entries might include order numbers, where the order numbers are generated sequentially and increase incrementally with time. As such, a lower order number would be associated with an older entry, for example, and thus the order numbers can be used to determine the relative ages of the various rows.

Returning to the example of FIG. 4A, table space 412 is stored physically in file A, shown in two portions as block A(1) 430(1) and block A(2) 430(2). In one embodiment, data of table space 412 is allocated to file A on an extent-by-extent basis.

In the example of FIG. 4A, the physical storage is divided into tier 1 storage 330 and tier 2 storage 340. Tier 1 storage 330 may contain higher quality-of-service storage devices than tier 2 storage 340. Storage system 404 may determine that a first portion (block) of file A, represented as block A(1) 430(1), should be located on tier 1 storage 330, and a second portion of file A, represented as BLOCK A(2) 430(2), should be located on tier 2 storage 340, as described more fully below.

FIGS. 5A, 5B, 5C, and 5D (5A-5D) illustrate an example of a sliding window allocation policy according to an embodiment of the present disclosure. FIG. 6 illustrates the movement of data between tiers in response to execution of a sliding window allocation policy according to an embodiment of the present disclosure.

Generally speaking, the data in table 500 is organized from newest to oldest, with the newest data being at the top of the volume (with respect to the orientation of the volume in FIG. 5A). As used herein, newest or most recent data can refer to data that was most recently created, or data that was most recently accessed. However, table 500 need not be ordered from newest to oldest because, as mentioned above, time-based information can be associated with each of the entries in the table and such time-based information can be used to rank the entries from newest to oldest.

In the examples of FIGS. 5A-5D and 6, there are two tiers (tier 1 and tier 2). Tier 2 is assumed to be the default tier. That is, as new data is added to volume 500, that data is stored in tier 2. The following discussion can be readily extended to storage systems that utilize more than two tiers, and can also be readily extended to storage policies in which the default tier is tier 1.

With reference first to FIG. 5A, and with reference also to FIG. 6, block 500 includes M units of data at some arbitrary time T0. The units of data may be measured in terms of bits, or they may be measured in terms of blocks of data (e.g., extents).

At some point after time T0 (time T0+), an allocation policy (which may also be referred to as a relocation policy or placement policy) is executed and enforced. The purpose of the allocation policy is to move some of the data from the default tier to a different tier. In the examples of FIGS. 5A-5D and 6, the purpose of the allocation policy is to select data that is to be moved from its current tier (e.g., the default tier, tier 2) to a higher tier (e.g., tier 1). Alternatively, an allocation policy can be specified for the purpose of moving selected data from its current tier to a lower tier.

The allocation policy is of the form "allocate N percent of the more recent data for storage in tier 1 and leave the remainder of the data in tier 2." In the examples of FIGS. 5A-5D and 6, N is 25 (25 percent).

If there are more than two tiers in the multi-tier storage system, then the allocation policy can specify a certain percentage for each tier. Such a policy can be expressed in different forms. For example, in a storage system with three tiers, the policy can be of the form "starting with the most recent data, allocate X percent to tier 0, then the next Y percent to tier 1, and leave the remainder in tier 2." Alternatively, in a storage system with three tiers, a policy can be specified for each pair of tiers, for example: "for the data in tier 2, allocate X percent of the most recent data to tier 1 and leave the remainder in tier 2; and for the data in tier 1, allocate Y percent of the most recent data to tier 0 and leave the remainder in tier 1." In general, an allocation policy will dictate that a specified percentage of newer data be allocated to higher tiers, with the remaining (older) data allocated to lower tiers.

Figure 5B:
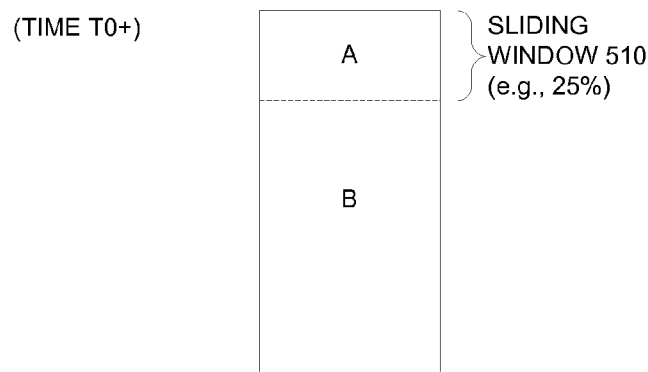
Figure 6:
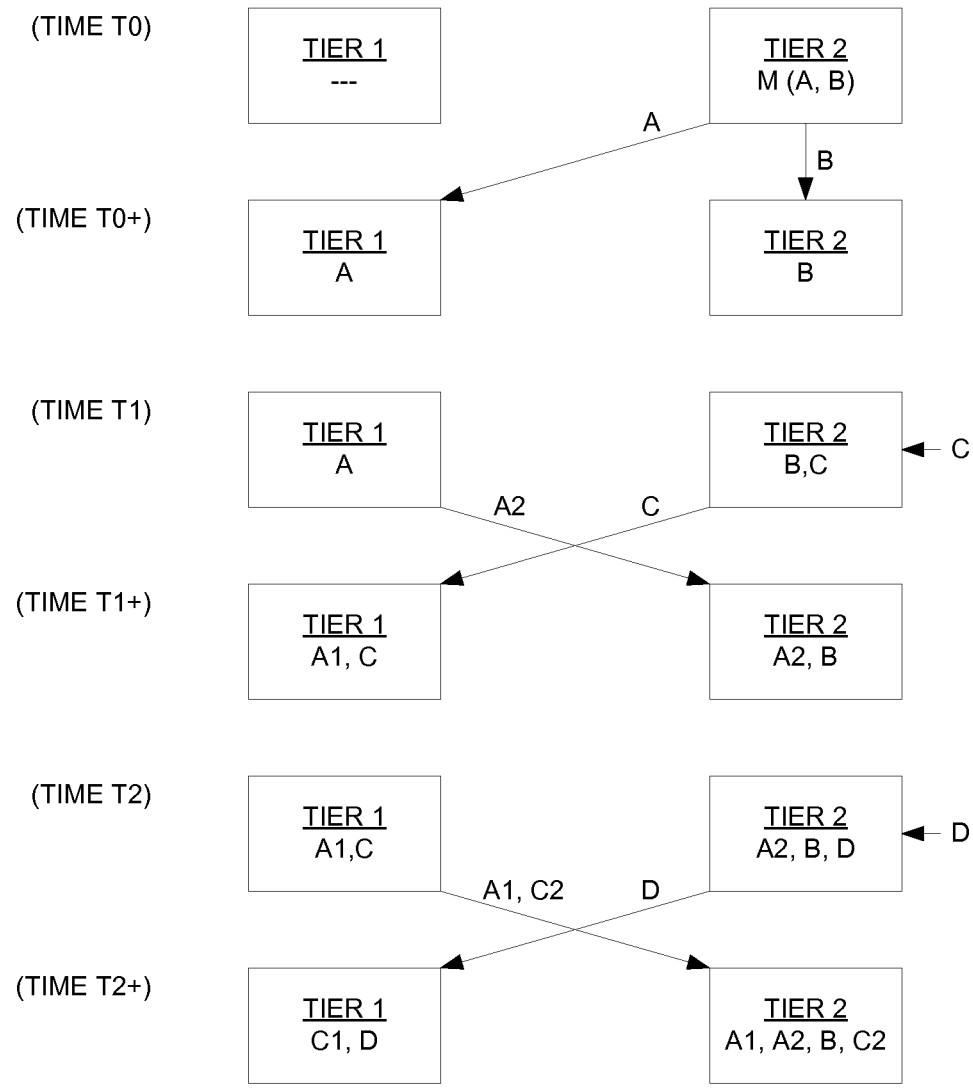
FIG. 6 illustrates the movement of data between tiers in response to execution of a sliding window allocation policy according to an embodiment of the present disclosure.

With reference to FIGS. 5B and 6, at time T0+, the most recent 25 percent of the data (identified as data A) is allocated to tier 1, and the remaining 75 percent of the data (identified as data B) remains in tier 2. Accordingly, 25 percent of the data is moved to tier 1, and the remainder stays in tier 2. The window of data allocated to tier 1 is identified as sliding window 510.

As noted above, data may be stored as extents (contiguous blocks of data). As such, data is moved from one tier to another at the extent level. At the extent level of granularity, it might not be possible to select and move exactly N (e.g., 25) percent of the data from one tier to another. For example, nine extents might correspond to less than 25 percent of the data, while ten extents might correspond to more than 25 percent. In such a scenario, only nine extents are allocated and moved. In other words, in one embodiment, the amount of data moved corresponds to the maximum number of extents that can be moved without exceeding the specified percentage.

Figure 5C:
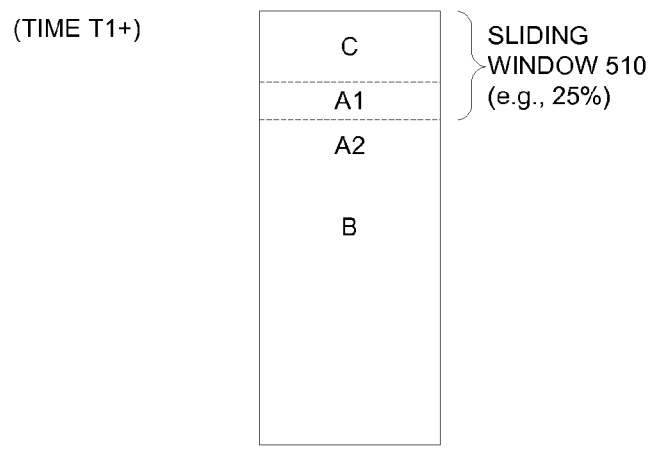

With reference to FIGS. 5C and 6, during the period between time T0 and time T1, new data (data C) is added to table 500. At some point after time T1 (time T1+), the allocation policy is again executed and enforced. In the example, data C is moved to tier 1, and some portion of data A (the portion labeled A2) is moved back to tier 2; the remaining portion of data A (the portion labeled A1) stays in tier 1. Thus, in FIG. 5C, the sliding window 510 encompasses data C plus data A1. As shown in FIG. 6, at time T1+, data C and data A1 are allocated to and stored in tier 1, while data B and data A2 are allocated to and stored in tier 2.

Figure 5D:
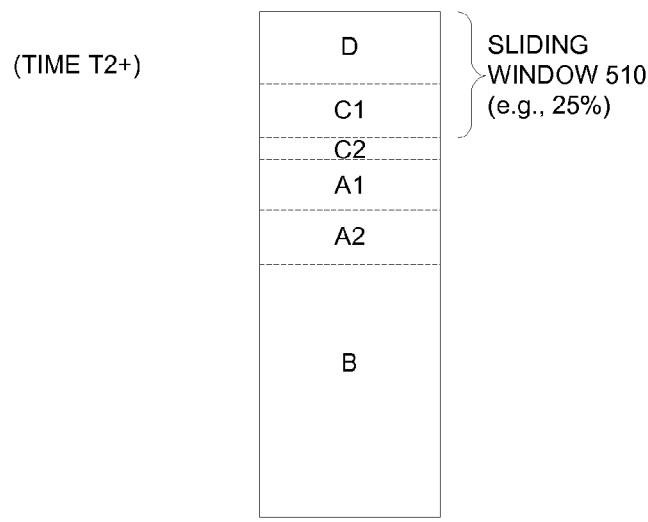

With reference to FIGS. 5D and 6, during the period between time T1 and time T2, new data (data D) is added to table 500. At some point after time T2 (time T2+), the allocation policy is again executed and enforced. In the example, data D is moved to tier 1, and some portion of data C (the portion labeled C2) is moved back to tier 2; the remaining portion of data C (the portion labeled C1) stays in tier 1. Thus, in FIG. 5D, the sliding window 510 encompasses data D plus data C1. As shown in FIG. 6, at time T2+, data D and data C1 are allocated to and stored in tier 1, while data A (A1 plus A2), data B, and data C2 are allocated to and stored in tier 2.

In this manner, the most recent data can be stored in a higher tier, but space in that tier is not overly allocated to or totally consumed by less recent data. Also, a granular implementation (e.g., at the extent level) that provides value in terms of storage utilization even for structured data like databases is permitted.

Figure 7:
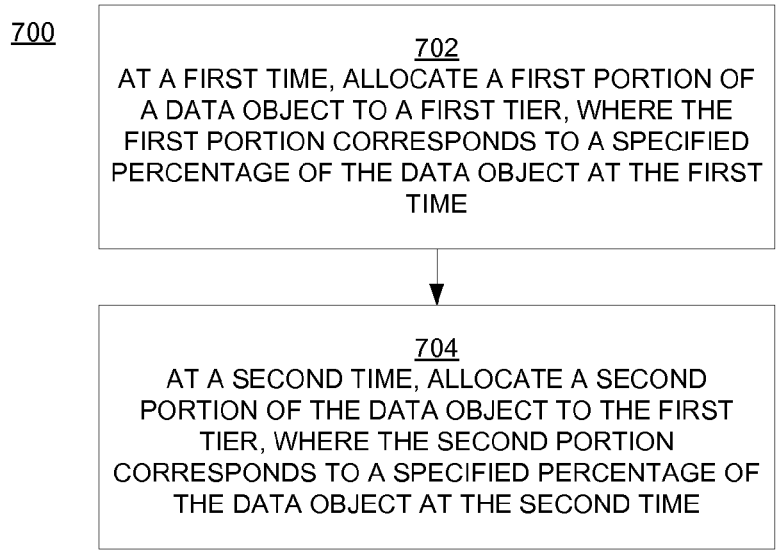
FIG. 7 is a flowchart of a computer-implemented process for allocating data according to an embodiment of the present disclosure.
Figure 8:
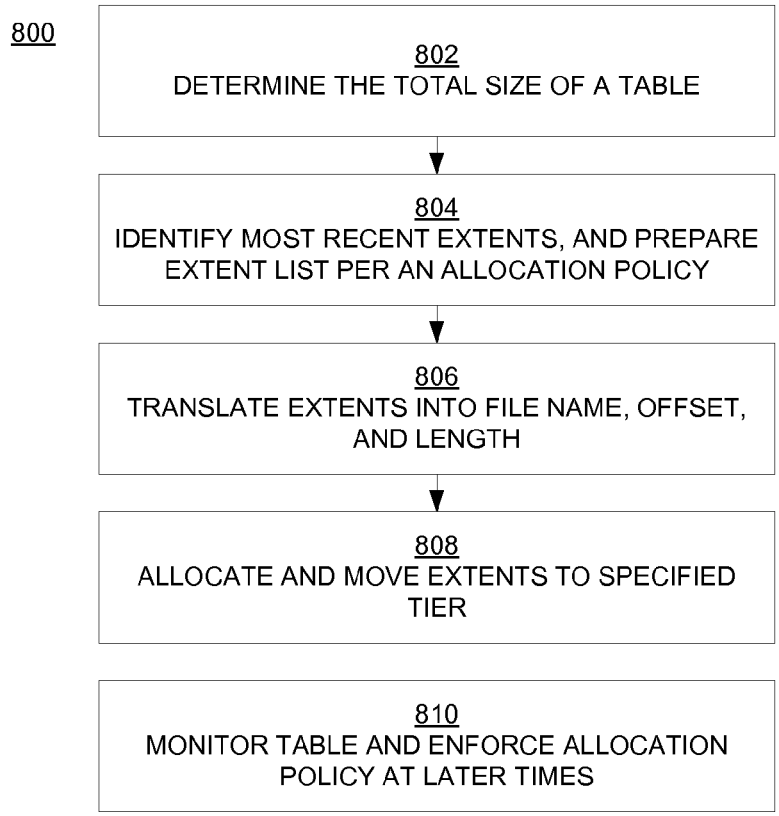
FIG. 8 is a flowchart of a computer-implemented process for allocating data according to another embodiment of the present disclosure.

FIG. 7 is a flowchart 700 of a computer-implemented process for allocating data according to an embodiment of the present disclosure. FIG. 8 is a flowchart 800 of a computer-implemented process for allocating data according to another embodiment of the present disclosure. Flowcharts 700 and 800 can be implemented as computer-executable instructions residing on some form of computer-readable storage medium (e.g., using computing system 110 of FIG. 1).

In block 702 of FIG. 7, at a first time, a first portion of the data object (e.g., a first number of extents) is allocated to a first tier (e.g., tier 1; here, "first" is used as a modifier and does not necessarily refer to the highest tier) of a multi-tier storage system. The first portion (e.g., the first number of extents) corresponds to a first specified percentage of the size of the data object at the first time. The first portion (first number) is selected according to information associated with the data object. In one embodiment, the information used to select the first portion is time-based. The time-based information can be used to rank data in the data object from newest data to oldest data. Accordingly, the first portion can be selected by selecting relatively newer data until the first specified percentage is reached. The remaining portion of the data object at the first time is allocated to one or more other tiers of the multi-tier storage system.

In block 704, at a second (later) time, a second portion of the data object (e.g., a second number of extents) is allocated to the first tier. The second portion (e.g., the second number of extents) corresponds to a second specified percentage of the size of the data object at the second time. The second portion (second number) is also selected according to the aforementioned information (e.g., time-based information) associated with the data object. Accordingly, the second portion can be selected by selecting relatively newer data until the first specified percentage is reached. The remaining portion of the data object at the second time is allocated to the other tier(s).

The process described by block 702 or 704 can be performed at set times or after set time intervals. Alternatively, the data object can be monitored and the process described by block 702 or 704 can be performed after the size of the data object changes by a prescribed amount or the amount of new data crosses a specified threshold.

With reference now to FIG. 8, in block 802, the total size of a table is determined. The size of each extent in the table is determined.

In block 804, the most recent extents are identified, and an extent list is prepared according to an allocation policy. For example, the policy might specify, for example, that 25 percent of the most recent data in a table is to be stored in a higher tier (e.g., tier 1) while the remainder of the data in the table is to be stored in the next highest tier (tier 2). In this example, 25 percent of the most recent extents would be included in the extent list.

In block 806, from the extent list, catalog tables can be queried to translate the extents to a file name, offset, and length. Generally speaking, the extents are entries in a table in a database format, and are translated into memory locations.

In block 808, relocation methods associated with the multi-tier storage system are used to allocate and move extents in the extent list to the specified tier. For example, extents can be relocated by moving them from one tier to another tier, or by copying the extents to one tier and then deleting them from their original tier.

In block 810, the table is monitored and the allocation policy enforced is enforced on a periodic basis. For example, the extent list can be updated on a daily basis, in which case the data can be allocated/reallocated among the tiers on a daily basis.

If a row of data is deleted from a table for some reason, that data is automatically evacuated from the tier in which it is stored. Importantly, if data residing in the highest tier (e.g., tier 1) is deleted, that data is automatically removed from that tier because that data will not be in the extent list and hence will not be a candidate for tier 1 storage. The allocation (reallocation) policy thus has a self-evacuation mode that reduces storage costs.

Thus, according to embodiments of the present disclosure, the most recent data (which, in many cases, is also the data most often used) can be stored in a higher tier. Storage needs can be strategically and effectively planned, and storage can be grown proportionally to the amount of data without compromising performance. The issue of failed database transactions, which might arise if the storage system runs out of usable space on a particular tier, can be avoided. Also, embodiments according to the present disclosure permit a granular implementation (e.g., at the extent level) that provides value in terms of storage utilization even for structured data like databases.

The allocation (relocation) policy can be changed over time as the usefulness and criticality of the stored data changes, so that the right amount of data is stored in the right storage tier. In general, costs are reduced and performance is improved.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having computer-executable instructions for causing a computer system to perform a method comprising:
   accessing a database object, wherein a size of said database object changes over time;
   at a first time, allocating a first portion of said database object for storage in a first tier of a multi-tier storage system, said first portion corresponding to a first specified percentage of the size of said database object at said first time, wherein said first portion is selected according to information associated with said database object, and wherein a first remaining portion of said database object at said first time is allocated for storage in one or more other tiers of said multi-tier storage system; and
   at a second time, after said first time, allocating a second portion of said database object for storage in said first tier, said second portion corresponding to a second specified percentage of the size of said database object at said second time, wherein said second portion is selected according to said information, and wherein a second remaining portion of said database object at said second time is allocated for storage in said one or more other tiers.

2. The non-transitory computer-readable storage medium of claim 1 wherein said database object comprises a table, wherein an at least one data comprises entries in said table, and wherein said at least one data is stored as a plurality of extents, said extents each comprising a plurality of contiguous blocks of memory.

3. The non-transitory computer-readable storage medium of claim 2 wherein said method further comprises:
   determining the size of said table at said first time;
   accessing time-based information associated with each of said extents; and
   starting with the most recent of said extents based on said time-based information and continuing the most recent of said extents, selecting a subset of said extents comprising newer extents, wherein said subset comprises a number of said extents that corresponds to said first specified percentage.

4. The non-transitory computer-readable storage medium of claim 2 wherein said method further comprises translating each of said extents to a file name, offset, and length.

5. The non-transitory computer-readable storage medium of claim 1 wherein said database object comprises a plurality of data, wherein said information is time-based and used to rank said plurality of data from newest data to oldest data, wherein said first portion and said second portion are each selected by selecting relatively newer data from said plurality of data according to said rank until, respectively, said first specified percentage and said second specified percentage are reached.

6. The non-transitory computer-readable storage medium of claim 1 wherein a different percentage is specified per database object.

7. The non-transitory computer-readable storage medium of claim 1 wherein said first specified percentage and said second specified percentage have the same value.

8. The non-transitory computer-readable storage medium of claim 1 wherein said method further comprises, if data in said first portion is deleted, then automatically evacuating said data from said first tier.

9. A computer system comprising:
a processor; and
memory coupled to said processor and having stored therein instructions that, if executed by said computer system, cause said computer system to execute a method comprising:
accessing a database object, wherein a size of said database object changes from a first amount at a first time to a second amount at a second time, wherein said second time is after said first time;
at said first time, storing a first portion of said database object in a first tier of a multi-tier storage system, said first portion corresponding in size to a first specified percentage of said first amount, wherein said first portion is selected according to information associated with said database object, and wherein a first remaining portion of said database object is stored in one or more other tiers of said multi-tier storage system; and
at said second time, allocating a second portion of said database object for storage in said first tier, said second portion corresponding in size to a second specified percentage of said second amount, said second portion selected according to said information, and wherein a second remaining portion of said database object is stored in one or more other tiers of said multi-tier storage system.

10. The computer system of claim 9 wherein said database object comprises a table, wherein said data comprises entries in said table, and wherein said data is stored as a plurality of extents, said extents each comprising a plurality of contiguous blocks of memory.

11. The computer system of claim 10 wherein said method further comprises: at said first time, determining a size of said table; accessing time-based information associated with each of said extents to identify an age for each of said extents; and starting with the youngest extent of said extents based on said time-based information and continuing from said youngest extent, selecting a subset of said extents comprising newer extents, wherein said subset comprises a number of said extents that corresponds to said first specified percentage.

12. The computer system of claim 9 wherein said information is time-based and used to rank data in said database object at said first time and at said second time from newest data to oldest data, wherein said first portion and said second portion are each selected by selecting relatively newer data according to said rank until said, respectively, said first specified percentage and said second specified percentage are reached.

13. The computer system of claim 9 wherein a different percentage is specified per database object.

14. The computer system of claim 9 wherein said first specified percentage and said second specified percentage have the same value.

15. A computer-implemented method comprising:
determining the size of a database object at a first time;
at said first time, storing a first portion of said database object in a first tier of a multi-tier storage system, said first portion corresponding to a first specified percentage of the size of said database object at said first time, wherein said first portion is selected according to information associated with said database object, and wherein a first remaining portion of said database object at said first time is stored in one or more other tiers of said multi-tier storage system;
determining the size of said database object at a second time; and
at said second time, after said first time, allocating said database object between said first tier and said one or more other tiers as necessary so that a second portion of said database object at said second time is stored in said first tier, said second portion corresponding to a second specified percentage of the size of said database object at said second time, said second portion selected according to said information, and wherein a second remaining portion of said database object is stored in one or more other tiers of said multi-tier storage system.

16. The method of claim 15 wherein said database object comprises a table, wherein said data comprises entries in said table, and wherein said data is stored as a plurality of extents, said extents each comprising a plurality of contiguous blocks of memory.

17. The method of claim 16 wherein said method further comprises translating each of said extents to a file name, offset, and length.

18. The method of claim 15 wherein said information is time-based and is used to rank data in said database object at said first time and at said second time from newest data to oldest data, wherein said first portion and said second portion are each selected by selecting relatively newer data according to said rank until said, respectively, said first specified percentage and said second specified percentage are reached.

19. The method of claim 15 wherein a different percentage is specified per database object.

20. The method of claim 15 wherein said first specified percentage and said second specified percentage have different values.

* * * * *